Figure 1:
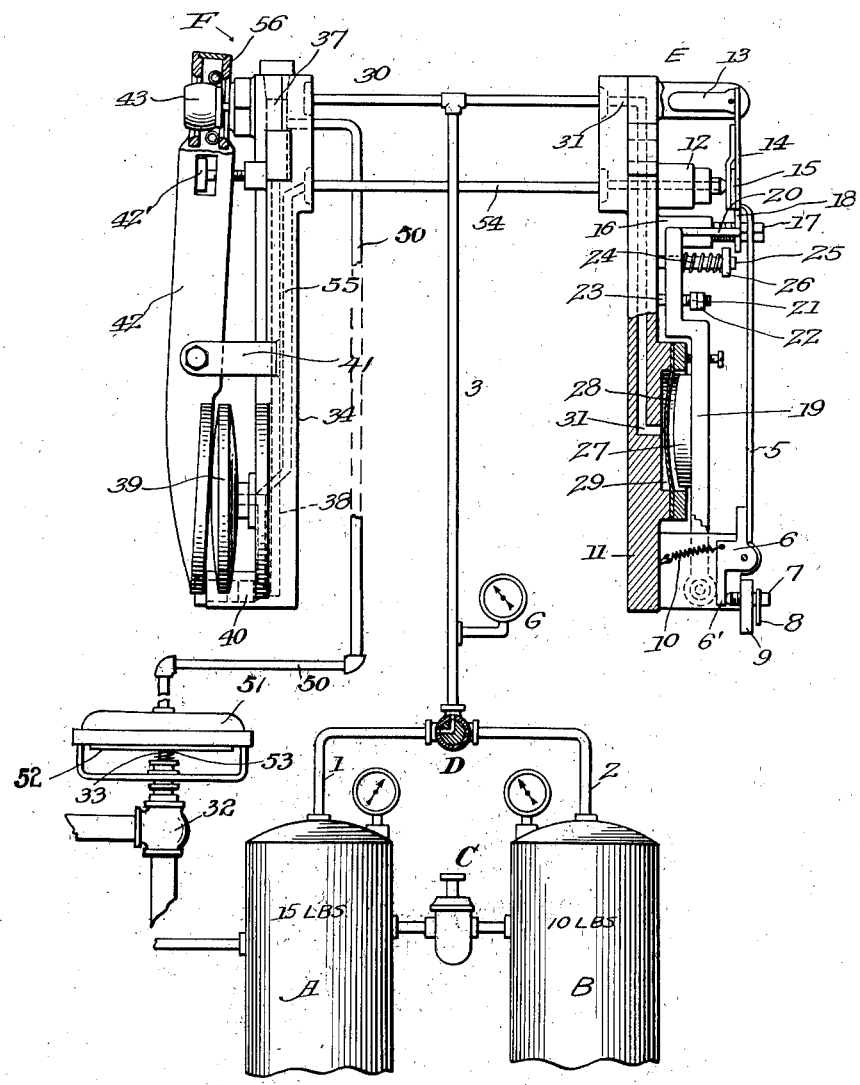

Aug. 24, 1926.  
C. L. FORTIER  
1,597,350  
TEMPERATURE CONTROL APPARATUS  
Original Filed June 12, 1924   2 Sheets-Sheet 1

Inventor:  
Charles L. Fortier;  
By Dodge and Sons  
Attorneys

Aug. 24, 1926.
C. L. FORTIER
1,597,350
TEMPERATURE CONTROL APPARATUS
Original Filed June 12, 1924     2 Sheets-Sheet 2
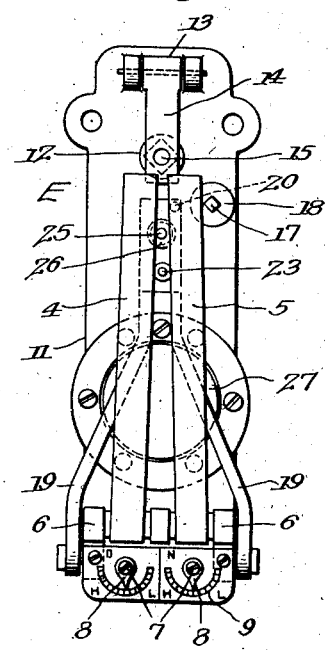
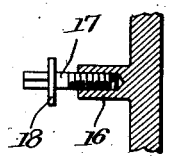
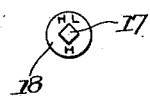
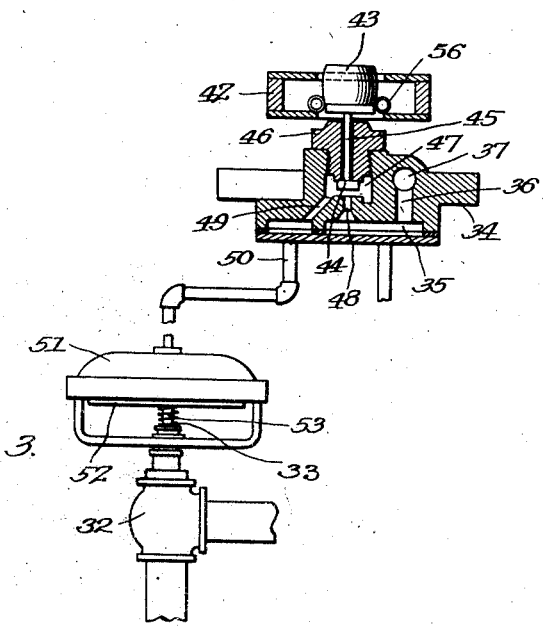
Inventor:
Charles L. Fortier,
By Dodge and Sons,
Attorneys Patented Aug. 24, 1926.

1,597,350

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

TEMPERATURE-CONTROL APPARATUS.

Application filed June 12, 1924, Serial No. 719,621. Renewed March 17, 1926.

This invention consists in a novel means for placing a control system of the compressed-air type, at will, under the control of either of two devices both responsive to similar atmospheric changes, but operative from different starting points, or adapted to maintain relatively different degrees of temperature, humidity, or the like, in accordance with initial setting of the devices. The general construction and mode of operation of the device is the same whether temperature or humidity is to be controlled, except that the responsive element in the one case is sensitive or responds to changes in temperature, and in the other case to changes in humidity in the surrounding medium. In other words, thermostats are employed where a given temperature is to be maintained, and humidostats are employed where a given degree of percentage of humidity is to be maintained.

The purpose of this invention is the same as that set forth in application Serial No. 715,449, filed in my name on the 23rd day of May, 1924, but the present apparatus is somewhat simpler and dispenses with pawl and ratchet mechanism for placing in control one or the other of the two devices responsive to atmospheric changes.

The invention is illustrated in the accompanying drawings, wherein:

Figure 1 is a diagrammatic view showing the essential parts of the apparatus, the selector being partly in section, and the main supply valve and tanks being shown in greatly reduced proportions as compared with the control devices per se;

Fig. 2, a front elevation of the selector;

Fig. 3, a sectional view of the three-way valve by which delivery of compressed air to the motor of the main valve is cut off and the air chamber of said motor vented, or is opened and said air chamber sealed;

Figs. 4 and 5 details of a manually adjustable stop by which one of the two strips or members responsive to atmospheric changes is held out of or permitted to go into action.

In the present instance provision is made for maintaining in separate tanks or reservoirs, air under different degrees of compression, say 15 pounds for maintaining daytime temperature or humidity, as the case may be, and 10 pounds for maintaining night-time temperature, or a lesser degree of humidity, when such is desirable. These pressures are such as will ordinarily be used, but other pressures may be adopted if desired, the only essential requirement being that a reasonable difference in pressure be provided.

When the manually adjustable stop is set to permit free play of the responsive element with which it is associated, daytime temperature will be maintained if the usual 15 pounds air pressure to be supplied to and maintained in the main air pipe or conduit while a lower temperature will be brought about if the pressure be dropped, say to 10 pounds. The usual daytime temperature in hotels, offices, and apartments is 70 degrees Fahrenheit, but may be varied through adjustment of the responsive element employed, to give other desired daytime temperature. The lower temperature may be such as completely to cut off all supply of heat, or any temperature below the daytime temperature, according to the initial setting of the second responsive device.

The same remarks apply to humidity control,—there is a normal work-time humidity supplied and maintained in weaving rooms and the like, and the supply may be wholly cut off or reduced during other hours, and the same may be done wherever such variation is useful or desirable. The following description will be predicated upon temperature changes, but will apply to humidity changes by the simple substitution of the word "humidity" where temperature is used, and assuming an element responsive to humidity instead of temperature.

Referring to Fig. 1, A and B indicate air tanks, the first of which is supplied with air under compression up to the desired degree, by a pump having an automatic trip device to throw it out of action whenever the pressure reaches, and for so long as it maintains, the desired minimum, in the assumed case, 15 pounds. Between the tanks A and B is a reducing valve C through which air is delivered to the tank B under reduced pressure, 10 pounds under the conditions here assumed. Air is delivered from tank A through pipe 1, or from tank B through pipe 2, to a main supply pipe 3 having branches to the various control devices and relays throughout the building or structure in which the apparatus is installed. Communication between the tanks and pipe 3 is controlled by a three-way valve D, which may be set to close communication entirely between said tanks and the main supply pipe, or to connect either tank at will therewith and close communication for the time with the other tank. As the day temperature is the one more commonly desired, connection of pipe 3 will ordinarily be made with tank A, but when a lower temperature is desired, it will be made with tank B.

In each room, apartment, or space in which the temperature is to be controlled and maintained at a predetermined degree, there is placed a selector E having two independently adjustable thermo-responsive members or elements, each capable of initial adjustment to function at any temperature desired, and both arranged to actuate a valve or closure of a leak-port, the sealing of which brings into action a relay or means for shutting off the supply of heat in the space or apartment. The selector is provided with two thermostatic bars or strips 4 and 5, each carried at its lower end by a separate saddle 6 having a depending arm 6′ which bears against the end of an adjusting screw 7 provided with an indicator arm 8 movable over a graduated dial 9. The upper arm of each saddle is drawn by a spring 10 toward the base or supporting plate 11 in which the saddles are pivoted, the spring thus serving also to hold arm 6′ in contact with screw 7. The thermostatic strips or elements 4 and 5 are both arranged with the metal or substance having the higher co-efficient of expansion on the outer side, so that said strips shall warp or bend inward toward the base or plate 11 upon rise of temperature, and outward or away from said base on lowering of the temperature. The base or plate 11 is provided with a nipple 12 having a small hole drilled axially through it to serve as a leak-port, to be hereinafter referred to.

Pivotally supported between arms at the upper end of the base or plate 11 is a horizontal block or arm 13, to which is atttached a depending bar 14 provided with a pad 15, preferably of celluloid, adapted to press lightly against the end of the nipple 12 and close the leak-port therein when acted upon by either of the upstanding thermostatic bars or strips 4 or 5. The long arm of the block 13 acts as a weight, tending constantly to swing the bar 14 outward or away from the nipple and thus to unseal the leak-port, said counterweight and one or the other of the thermostatic strips thus acting always in opposition.

Projecting from the front face of the base or supporting plate 11 is a tubular post 16, which is drilled and tapped to receive the threaded end of a stop-screw 17 having near its outer end a flange 18, the outer extremity of the stop-screw being made polygonal to receive a key or turning implement, or otherwise adapted to be turned. Post 16 is so located that the stem of the stop-screw 17 shall clear the outer edge of the thermostatic strip 5 which, in the arrangement here shown, represents the low temperature strip, but the flange 18 stands in the path of said strip, and if the stem be adjusted sufficiently outward from the base or plate, will preclude the inward movement of said strip 5 to an extent sufficient to seat the valve or pad 15 over the leak-port at any temperature; in other words, said strip 5 will be made wholly inoperative for the time. If, however, it be desired to render strip 5 capable of operation until otherwise thrown out of action, as presently described, the stop-screw 17 is screwed into its socket in the post 16 a distance sufficient to carry flange 18 out of arrestiong position. In whatever way strip 5 is prevented from moving inward far enough to seat the valve 15 and close the leak-port, said strip will be prevented from functioning, and the thermostat will operate in the same way as an ordinary single-strip instrument; that is to say, the leak-port will be under the sole control of the day temperature strip 4.

Pivotally mounted upon base or support 11, preferably upon screws screwing into the outer pair of the three arms between which the saddles 6 are pivoted, is an upright swinging frame 19 having at its upper or free end a projecting pin or stud 20, the outer extremity of which stands directly in the path of inward movement of thermostatic strip 5, but in the position of the parts shown in Fig. 1 not reaching outward far enough to interfere with the proper functioning of said strip. The outward movement of the frame 19 is limited and determined by a nut, or nut and jam-nut, 21 and 22 carried by a threaded stem 23 projecting from the face of base or plate 11. The frame 19 is pressed inward toward the plate 11 by a spring 24 carried by a threaded stem 25, and bearing a nut 26 by which the compression of the spring may be varied as desired.

Frame 19 is provided with a disk or "saucer" 27, which faces and bears against a flexible diaphragm 28 forming the front wall of a chamber 29 to which air under pressure is supplied by the pipe or main 3 through a branch 30 communicating by a passage 31 with said chamber. So long as air at sufficient pressure is supplied to chamber 29 and the diaphragm 28 is thereby pressed outward or distended, the frame 19 will be forced outward against the resistance of spring 24, and the responsive element or thermostatic strip 5 will be forced and held away from contact with depending arm 14 by the projecting pin or stud 20. The spring 24 is, however, adjusted to resist a pressure up to say 10 pounds, or materially below 15 pounds, when pressures of 15 and 10 pounds are maintained in the tanks A and B respectively; hence the frame 19 will be forced outward only when the pipe 3 is in communication with tank A. If communication with said tank be cut off, and established with tank B having the lesser pressure of 10 pounds, the pressure in pipe 3 and consequently in chamber 29 will fall, spring 24 will force frame 19 inward, and will carry backward the pin or stud 20 to a point where it will no longer hold strip 5 out of action. Strip 5 being consequently free to move inward, and being adjusted to do so at a temperature materially below that at which strip 4 will function or be warped inward to press valve 15 against nipple 12, said strip 5 will seal the nipple while the strip 4 is still held away. So long as the pressure in chamber 29 remains below 15 pounds, the sealing of the leak-port of nipple 12 will be maintained by the low temperature element or strip 5. If, now, valve D be so adjusted as to disconnect tank B and connect tank A with the pipe line 3, thereby restoring the normal 15 pound pressure in said pipe, diaphragm 28 will be distended, and will force frame 19 outward and through pin or stud 20 will force and hold back the strip 5, leaving the temperature under control of the high temperature strip 4.

F indicates a positive-action relay which when the leak-port of nipple 12 is sealed, actuates a quick-throw valve in a manner to effect the closing of the main heat supply valve 32 in opposition to the opening tendency of a spring 33, thus shutting off the supply of heating medium and continuing so to do so long as the leak-port is sealed. Upon a fall of temperature below that for which the strip 4 is adjusted, the strip 5 will move outward permitting the weighted arm 13 to swing outward the bar 14, thereby unsealing the leak-port and permitting spring 33 of the main heat-supply valve 32 to open said valve after the well-known manner of the Johnson system of temperature control.

The relay F is here shown as of the type set forth in Letters Patent No. 1,109,913 granted to me, and dated September 8, 1914, though somewhat modified in detail. It comprises a base or supporting plate 34 containing in its upper end a space 35 which communicates by a passage 36 with a filter chamber 37, which in practice is filled with wool or like material to take out dust or light matters carried by the air, which might otherwise eventually reach the leak-port and by reason of its minute opening, clog the same. The filter chamber 37 communicates by a passage 38 with the interior of an expansible chamber 39 having its outer wall at least, or both inner and outer walls, formed of flexible material advisably corrugated to facilitate its flexing or bulging outward under pressure. Between the expansible chamber 39 and the filter 37 there is located a needle valve 40 by which the passageway for air to chamber 39 may be made of less capacity than the leak-port of nipple 12, which vents chamber 39 as later explained.

Projecting forward from the base or plate 34 are arms 41, one of which is seen in Fig. 1, said arms being separated to receive and support between them a frame 42 of box-like construction at its upper end, and having the front and rear walls of the box-like portion provided with openings to receive and permit relative movement of the spherical head 43 of a valve 44, the stem 45 of which passes somewhat loosely through a nipple 46 screwed into the face of the base or plate 34, the disk or valve 44 being mounted upon the inner end of said stem, as seen in Fig. 3. Valve 44 is arranged within a chamber 47 provided with two valve seats, that at the forward side formed by the inner end of nipple 46, and the second at the rear side encompassing an air inlet port 48 opening into space or chamber 35. Valve chamber 47 communicates by a passage 49 with a pipe 50 extending to the air chamber of a pneumatic motor 51, the diaphragm 52 of which is attached to or bears upon the stem 53 of the main heat-supply valve 32, thus serving to hold the valve seated and to cut off the supply of heat so long as the leak-port of nipple 12 is sealed and pressure consequently stored up in the air chamber of motor 51. The leak-port of nipple 12 of selector E communicates by a pipe 54 with a passage 55 connecting the central air inlet of chamber 39 with air passage 38 at a point beyond the needle valve 40, so that chamber 39 will be vented whenever the leak-port of nipple 12 is unsealed, since the capacity of said leak-port exceeds that of passage 38 beyond the needle valve 40, as above mentioned.

Carried in the box-like head of frame 42 and encircling the spherical head 43 of valve 44 is a contractile spring 56, which is preferably in the form of a helically coiled wire having its two extremities joined so as to make an annular spring. The diameter of the coils of the spring is somewhat less than the width of its containing space within the box, so that it may roll upon the spherical head 43 as it is moved over the same through oscillation of frame 42. By reason of its tendency to contract, this annular spring imparts a quick movement to spherical head 43 and consequently to valve 44, as soon as it passes the equatorial plane of said spherical head and comes to rest against a wall of the box-like head. As a consequence, the valve is given a quick throw in a direction the reverse of that in which the contractile spring is moved by frame 42.

From the foregoing description it will be manifest that whenever leak-port 12 is sealed in response to rise of temperature, expansible chamber 39 will be inflated, the upper end of frame 42 will be moved inward, spherical head 43 and the connected valve 44 will be moved outward, the outer face of valve 44 at the time sealing the venting space encompassing the stem 45, and inlet port 48 will be opened, thus admitting air from space 35 through port 48 into valve chamber 47 whence it passes by port 49 and pipe 50 to the air chamber of pneumatic motor 51 of the main air valve, thus seating said valve and cutting off the heat supply. An adjustable stop-nut 42' limits the outward movement of frame 42 (see Fig. 1).

With the parts constructed and arranged as above set forth, the flange or disk 18 may be manually adjusted to hold out of action the low temperature thermostatic strip 5, or to permit said strip to function, provided it be not held out of action by the stop-pin or stud 20. If at any time high temperature strip 4 be in control and low temperature strip 5 be held out of action through inflation of the diaphragm of motor 29 and consequent outward pressure of stud or pin 20 against the low temperature strip 5, and it be desired to place the instrument under control of said low temperature strip, it is necessary only to connect the main air pipe 3 with the tank B having the subnormal pressure. This reduction of pressure permits spring 24 to force inward the swinging frame 19, deflating motor 29 and withdrawing pin or stud 20 from contact with strip 5, permitting said strip to bear upon the depending bar or pad-carrier 14, and thus to seal the nipple 12. Such sealing of the nipple permits pressure to build up in the air chamber of motor 51 of the main heat valve, and to shut off completely the supply of heat, thus permitting the temperature to fall. Whenever it is desired to place the temperature again under the control of strip 4 and to restore daytime temperature, connection is established between high pressure tank A and pipe 3, when the foregoing operations will be reversed as above explained.

By this construction I am enabled to dispense entirely with the pawl and ratchet mechanism of my application before noted. It is to be understood that as in the previous case, a pressure gage G may be arranged in pipe 3 near valve D to indicate the actual pressure in said pipe, and enable the attendant to determine at a glance under the control of which of the two thermostatic elements 4 and 5 the instrument or instruments may at the time be.

I have here shown and described expansible chamber 29 as having one wall formed by a flexible diaphragm, but it is obvious that the well-known equivalents, a sylphon bellows, or a cylinder and piston, may be employed instead of the chamber and diaphragm, and these are within the scope of the present invention. Whatever the form or construction of the expansible chamber, the outer wall may itself constitute or carry the arresting stop for the strip 5, means essentially the same as those shown being provided to limit the outward movement, and to afford the requisite resistance to the outward movement and insure return movement of such outer wall. The swinging frame 19 is, however, provided to afford leverage sufficient to overcome the resistance of spring 24 with a relatively small expansible chamber such as 29, and to secure due amplitude of movement of the pin or stud 20.

The position of the cross bar or turning handle of valve D indicates under which strip (4 or 5) control is placed at any given time, so that the gage G is not essential for this purpose. It is, however, desirable to employ it so hat the precise pressure may be known at all times.

What is claimed is:—

1. In a control system of the compressed-air type, the combination of a main air supply pipe; means for connnecting said pipe at will with either of two sources of air of relatively different degrees of compression, and disconnecting it from the other of said sources; a selector comprising two elements both responsive to atmospheric changes of like character, and each adjustable independently of the other to cause the two to function at different points in the scale of such atmospheric changes; a stop element located in the plane of movement of one of said elements but adjustable to and from a position in which it will arrest such movement; an air chamber in communication with the air pipe and having a movable wall or portion capable of action in response to inflation and deflation of said chamber to directly throw the stop element into position for arresting the responsive element with which it is associated, or to permit said stop element to withdraw from such position.

2. In a control system of the compressed-air type, a selector provided with two like elements both sensitive to like meteorological changes, said elements adjustable to respond to relatively different degrees of change; a stop movable into position to arrest and hold out of action one of said elements; an expansible chamber having a movable wall which upon the inflation of the chamber acts upon and moves said stop into arresting position; and means for restoring said stop to non-arresting position; and means for delivering compressed air to said expansible chamber under different degrees of compression; whereby said stop will under normal pressure hold out of action said element but upon reduction of pressure permit it to function.

3. In a control system of the compressed-air type, provided wtih a main valve for controlling delivery of a conditioning medium to the atmosphere of a room or apartment, and with pneumatic means for operating said valve in response to atmospheric changes in said room or apartment; a selector comprising a base provided with an expansible chamber and with a leak-port for venting said pneumatic valve-actuating means, a valve or pad for sealing said leak-port, and two independent elements each responsive to atmospheric changes of like nature and initially adjustable to function at relatively different degrees in the scale of such atmospheric changes, both said elements capable of and arranged to act upon and seat said valve or pad to close the leak-port; and a stop for arresting and holding one of said responsive elements out of action, said stop being movable into and maintainable in strip-arresting position by the movable wall of the expansible chamber when said chamber is charged with air at predetermined pressure.

4. The combination of an automatic control device of the pressure fluid actuated type, including two elements responsive to atmospheric changes differently adjusted relatively to each other, and a pressure fluid supply line; means rendered effective by sustained abnormal pressure in said supply line to suspend the action of one of said elements; and means for establishing such abnormal pressure in said line.

5. In a thermostat, the combination of a pair of thermostatic elements; means for adjusting said elements relatively to each other; a valve mechanism in the path of action of both elements; a pressure fluid supply line connected with said valve mechanism; means rendered effective by sustained abnormal pressure in said line to shift one of said elements to inoperative position; and means for establishing such abnormal pressure on said line.

6. In a thermostat, the combination of a pair of thermostatic elements; means for adjusting said elements individually; a valve mechanism controllable by either of said elements; a pressure fluid supply line connected with said valve mechanism; means for establishing two characteristically different pressures in said supply line; and means subject to supply line pressure and arranged to render said thermostatic elements effective selectively on said valve mechanism, according as one or the other pressure is established in said supply line.

In testimony whereof I have signed my name to this specification.

CHARLES L. FORTIER.